(12) United States Patent     (10) Patent No.:     US 12,663,646 B2
     Kwak                         (45) Date of Patent:     Jun. 23, 2026

(54) VEHICLE DISPLAY APPARATUS AND METHOD

(71) Applicants: HYUNDAI MOTOR COMPANY, Seoul (KR); KIA CORPORATION, Seoul (KR)

(72) Inventor: Hee-Chon Kwak, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 19/076,739

(22) Filed: Mar. 11, 2025

(65)          Prior Publication Data

US 2026/0086357 A1      Mar. 26, 2026

(30)     Foreign Application Priority Data

Sep. 24, 2024     (KR) ........................ 10-2024-0129217

(51) Int. Cl.
     *G02B 27/01*          (2006.01)
     *G02B 27/00*          (2006.01)
(52) U.S. Cl.
     CPC ..... *G02B 27/0101* (2013.01); *G02B 27/0093* (2013.01); *G02B 27/0149* (2013.01); *G02B 27/0179* (2013.01); *G02B 2027/013* (2013.01); *G02B 2027/0138* (2013.01); *G02B 2027/0154*

(2013.01); *G02B 2027/0161* (2013.01); *G02B 2027/0181* (2013.01); *G02B 2027/0187* (2013.01)

(58) Field of Classification Search
     CPC ........... G02B 27/0093; G02B 27/0101; G02B 27/0149; G02B 27/0179; G02B 2027/013; G02B 2027/0138; G02B 2027/0154; G02B 2027/0161; G02B 2027/0181; G02B 2027/0187
     See application file for complete search history.

(56)          References Cited

U.S. PATENT DOCUMENTS

2017/0054963 A1*  2/2017  Kasazumi ............ B60K 35/211
2022/0203809 A1*  6/2022  Shimonomoto ....... B60K 35/28

FOREIGN PATENT DOCUMENTS

KR       2023-0000139 A      1/2023
KR       2023-0041352 A      3/2023

* cited by examiner

*Primary Examiner* — Cory A Almeida
(74) *Attorney, Agent, or Firm* — MCDONNELL BOEHNEN HULBERT & BERGHOFF LLP

(57)          ABSTRACT
A vehicle display device based on a windshield glass, which provides an unobstructed view while avoiding interference with a cowl panel in a vehicle. The vehicle display device includes a windshield glass to which a transmittance variable control technology is applied, a projector configured to project an image onto the windshield glass, and a transmittance controller configured to control a transmittance of an area in which the image is projected of the windshield glass.

12 Claims, 8 Drawing Sheets

| PROJECTION AREA | AREA A | AREA B | AREA C |
|---|---|---|---|
| SHAPE OF IMAGE | | | |
| TRANSMITTANCE GRAPH | HIGH TRANSMITTANCE ⌐‿⌐ LOW TRANSMITTANCE | | |

VEHICLE DISPLAY APPARATUS AND METHOD

CROSS REFERENCE TO RELATED APPLICATIONS

This application claims priority to Korean Patent Application No. 10-2024-0129217, filed on Sep. 24, 2024, which is incorporated herein by reference in its entirety.

BACKGROUND

Field of the Disclosure

The present disclosure relates to a vehicle display technology, and more specifically, to a vehicle display technology using windshield glass to which a transmittance variable control technology is applied.

Description of Related Art

Recently, as a vehicle display design, there has been introduced a concept that is slimmed by a method of projecting clusters, in vehicle information (IVI) monitors, passenger monitors, and the like on a ceramic area of windshield glass instead of conventional protruding displays.

However, when such a concept is applied, interference occurs between a display projector and a cowl panel inside a vehicle. In addition, a minimum height is required for a black ceramic area of the windshield glass used as a display projection area, and the black ceramic area may be covered even when the display is not used, thereby giving a stuffy feeling in terms of appearance.

Therefore, there is a need for a vehicle display technology that provides an unobstructed view when a display device is not used while avoiding interference between the cowl panel in the vehicle and the display projector.

SUMMARY

The present disclosure has been proposed to solve the above problems and is directed to providing a vehicle display technology based on windshield glass capable of avoiding interference between a cowl panel and a display projector in a vehicle.

In addition, the present disclosure is directed to allowing for an unobstructed view when the vehicle display device is not used by changing the transmittance of windshield glass.

To achieve the above objects, the present disclosure provides a vehicle display device based on windshield glass, which does not block a user's view while avoiding interference with a cowl panel in a vehicle.

The vehicle display device may include windshield glass to which a transmittance variable control technology is applied, a projector configured to project an image onto the windshield glass, and a transmittance controller configured to control a transmittance of an area in which the image is projected of the windshield glass.

In addition, the transmittance controller may set a transmittance control area in consideration of a shape of the image that changes according to an area-specific curvature of the windshield glass and control a transmittance for the set transmittance control area.

In addition, the transmittance controller may lower the transmittance of the transmittance control area so that the image is clearly visible.

In addition, the projector may be provided at a position spaced to prevent interference with a cowl panel in a vehicle, and the windshield glass may refract light output from the projector to be transmitted to a driver's eyes through a surface subjected to optical path modification.

In addition, the vehicle display device may further include a control module configured to generate and provide the image to the projector together with gaze information, wherein the image may be projected onto a position corresponding to the gaze on the windshield glass.

In addition, when the gaze is changed, the projector may re-project the image onto a position corresponding to the changed gaze, and the transmittance controller may re-set the transmittance control area and the transmittance in consideration of the area in which the image is re-projected.

In addition, the vehicle display device may further include a correction camera configured to check whether the area in which the image is projected matches the transmittance control area, wherein the control module may generate compensation information based on an error between the area in which the image is projected and the transmittance control area and provide the compensation information to the transmittance controller.

In addition, the transmittance controller may correct the transmittance control area and the transmittance in consideration of the compensation information and the area-specific curvature of the windshield glass.

On the other hand, another embodiment of the present disclosure provides a vehicle display method including, by a vehicle display device, setting a transmittance control parameter of windshield glass to which a transmittance variable control mode is applied in an initialization mode, and controlling a transmittance of an area in which an image is projected of the windshield according to the transmittance control parameter in a user mode.

In addition, the setting of the transmittance control parameter may include projecting a correction image onto the windshield glass, setting a transmittance control area in consideration of a shape of the correction image that changes according to the area-specific curvature of the windshield glass and controlling a transmittance for the set transmittance control area, measuring an error between the area in which the correction image is projected and the transmittance control area and generating compensation information based on the error, repeatedly correcting the transmittance control area and the transmittance in consideration of the compensation information and the area-specific curvature of the windshield glass, and storing a parameter at a time point when the error is smaller than a preset reference error through the correction as the transmittance control parameter.

In addition, the controlling may include setting the transmittance control area according to the transmittance control parameter and controlling the transmittance for the set transmittance control area.

In addition, the controlling may include lowering the transmittance of the transmittance control area so that the image is clearly visible.

In addition, the vehicle display method may further include tracking a driver's gaze, wherein the image may be projected onto a position corresponding to the gaze on the windshield glass.

In addition, the vehicle display method may further include when the gaze is changed, re-projecting the image onto a position corresponding to the changed gaze, and re-setting the transmittance control area and the transmittance in consideration of the area in which the image is re-projected.

According to the present disclosure, it is possible to provide the vehicle display technology based on the windshield glass capable of avoiding interference between the cowl panel and the display projector in the vehicle.

In addition, according to the present disclosure, it is possible to secure a sense of openness when the vehicle display device is not used by changing the transmittance of the windshield glass.

DETAILED DESCRIPTION

Figure 1:
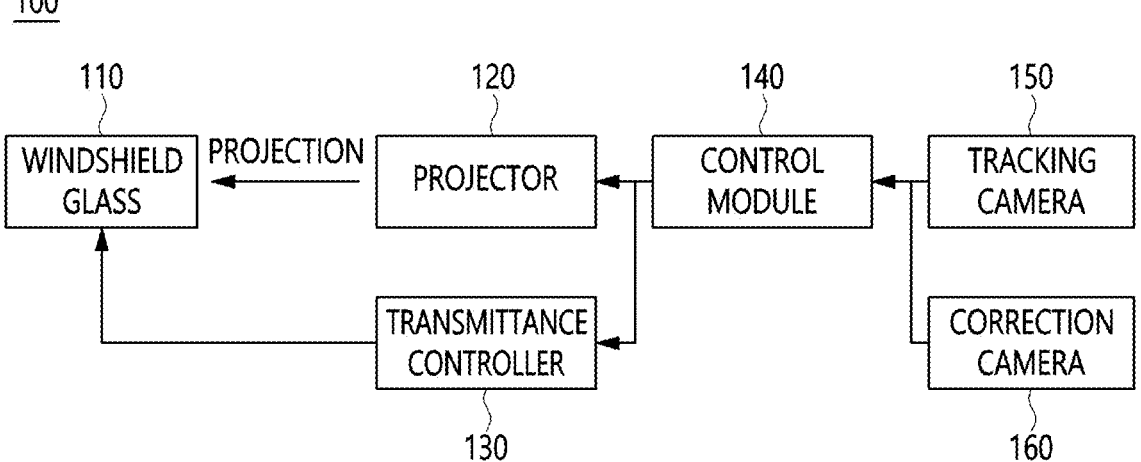
FIG. 1 is a block diagram of a configuration of a vehicle display device according to one embodiment of the present disclosure.

The above-described objects, features, and advantages will be described below in detail with reference to the accompanying drawings, and thus those skilled in the art to which the present invention pertains will be able to easily carry out the technical spirit of the present invention. In describing the present disclosure, when it is determined that a detailed description of the known technology related to the present disclosure may unnecessarily obscure the gist of the present disclosure, a detailed description thereof will be omitted.

Hereinafter, exemplary embodiments according to the present invention will be described in detail with reference to the accompanying drawings. In the drawings, the same reference numerals are used to denote the same or similar components.

FIG. 1 is a block diagram of a configuration of a vehicle display device according to one embodiment of the present disclosure.

Referring to FIG. 1, a vehicle display device 100 may include windshield glass 110, a projector 120, a transmittance controller 130, a control module 140, a tracking camera 150, and a correction camera 160.

The windshield glass 110 may adopt a transmittance variable control technology to variably change the transmittance for each area according to the control of the transmittance controller 130. Therefore, the transmittance may be lowered for only an area corresponding to an image projected from the projector 120 so that the image appears clear, and when the projector 120 is not used, the transmittance may be set to 100% to improve the view for a user and visibility in front of a vehicle.

In this case, the transmittance variable control technology is not limited to a specific technology and may adopt a technology that may be developed in the future. For example, a polymer dispersed liquid crystal (PDLC) film may be fused to the windshield glass 110 to variably control the transmittance.

In addition, the windshield glass 110 may refract light output from the projector 120 positioned so as not to interfere with a cowl panel in the vehicle through a surface subjected to optical path modification processing to be reflected toward a driver's eyes.

In this case, a surface processing unit for optical path modification processing may be applied in a micrometer or less, thereby minimizing the distortion of forward objects of the vehicle due to refractive reflection.

The projector 120 is an optical device for projecting an image onto the windshield glass 110 and may receive an image and information about the driver's gaze from the control module 140 to project the image onto the driver's gaze position.

The transmittance controller 130 may control the transmittance of the windshield glass 110 based on the transmittance variable control technology applied to the windshield glass 110.

For example, the transmittance controller 130 may receive a curvature of each area of the windshield glass 110, an image to be projected, and the driver's gaze information, and the like from the control module 140 and control only the transmittance at a position at which the image is projected of the windshield glass 110 to be lowered. Normally, the transmittance is maintained at 100%, but when the image is projected, only the transmittance of the corresponding area is controlled to be smaller than 10%.

The control module 140 may track the driver's gaze through the tracking camera 150 and generate and provide an image to be provided to the driver to the projector 120 and the transmittance controller 130.

For example, the control module 140 may generate various pieces of vehicle information, such as a speed, navigation, state messages, and warning messages, as images and provide the images to the projector 120 together with the gaze information in order to output the images to a driver's field of view area. In this case, to lower the transmittance of the area in which the image is projected onto the windshield glass 110, the related information may also be provided to the transmittance controller 130.

In addition, the control module 140 may check whether the area in which the image is projected onto the windshield glass 110 properly matches the transmittance control area in which the transmittance is lowered through the correction camera 160 and when an error occurs, generate compensation information for correction.

For example, the control module 140 may acquire an image projected onto the windshield glass 110 through a camera installed inside the vehicle or a driver's smartphone provided with a camera and analyze the acquired image to check whether an error occurs between the image projection area and the transmittance control area. When the error occurs, compensation information may be generated and provided to the transmittance controller 130 so that the transmittance control area may be corrected to reduce the error.

The control module 140 may include a microcomputer, a microprocessor, an electronic circuit, a communication circuit, a memory, etc.

The memory may be configured in combination of non-volatile memories, such as a solid state disk (SSD), a hard disk drive, a flash memory, an electrically erasable programmable read-only memory (EEPROM), a static RAM (SRAM), a ferro-electric RAM (FRAM), a phase-change RAM (PRAM), and a magnetic RAM (MRAM) and/or volatile memories, such as a DRAM, a synchronous DRAM (SDRAM), and a double data rate-SDRAM (DDR-SDRAM).

The tracking camera 150 may be installed at a position at which the driver's face may be captured in the vehicle and may track the driver's gaze while capturing the driver's face.

The correction camera 160 may be installed at a position at which the windshield glass 110 may be captured in the vehicle and may capture an image projected onto the windshield glass to the captured image to the control module 140.

Figure 2:
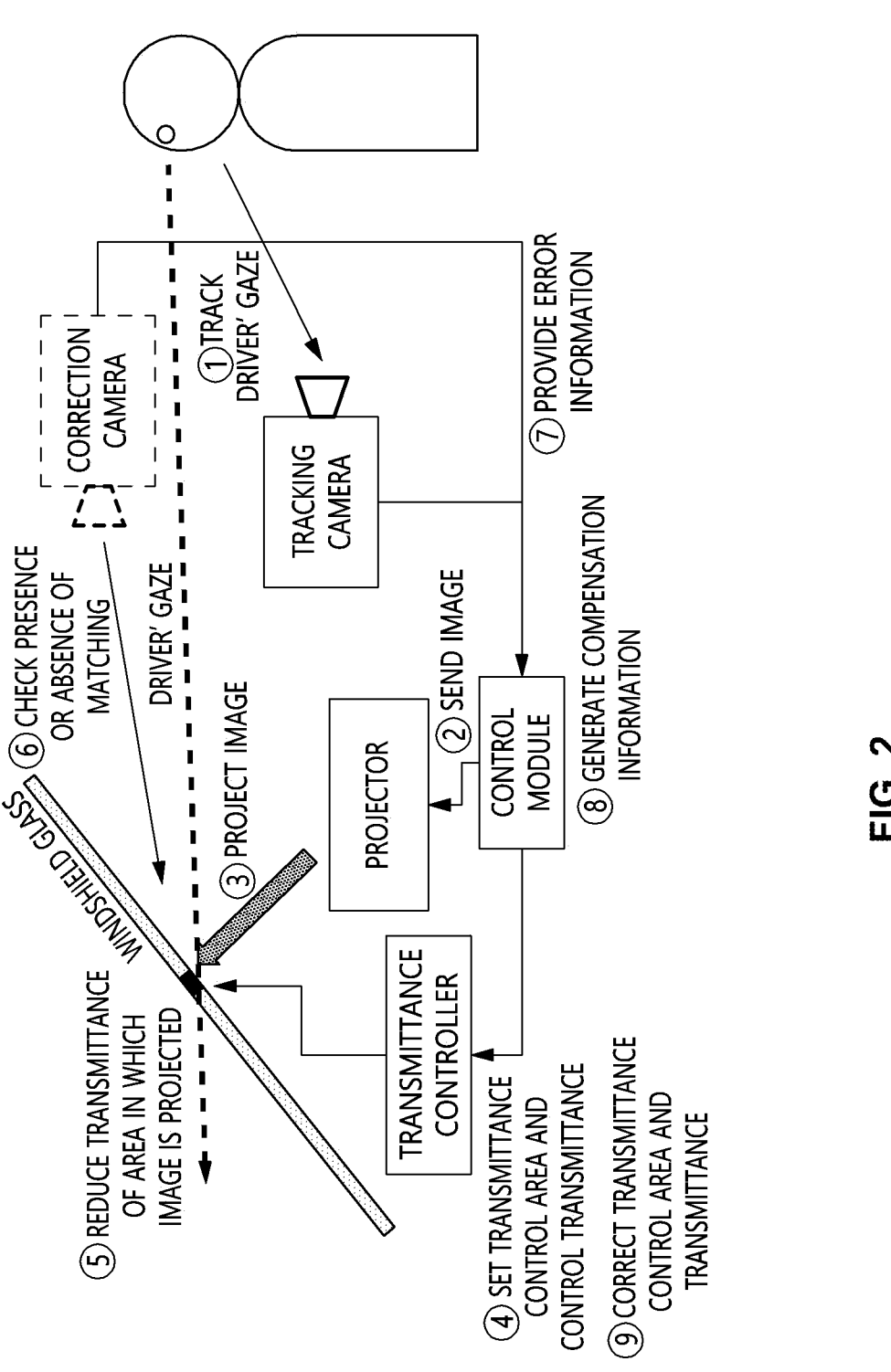
FIG. 2 is a view showing one example of the operation process of the vehicle display device shown in FIG. 1.

FIG. 2 is a view showing one example of the operation process of the vehicle display device shown in FIG. 1.

Referring to FIG. 2, first, the tracking camera may track the driver's gaze while capturing the driver's face.

Then, the control module may acquire the driver's gaze information through the tracking camera and generate and send an image to be provided to the driver to the projector. At this time, the control module may provide the gaze information together.

Then, the projector may project the image at a position at which the driver's gaze stays on the windshield glass.

In addition, the control module may provide information necessary for controlling the transmittance of the image projection area to the transmittance controller at the time of sending the image to the projector, and the transmittance controller may control the transmittance by setting the transmittance control area based on the provided information.

At this time, the control module may provide the curvature information of the windshield glass together with the image and the gaze information.

Therefore, the transmittance controller may set the transmittance control area in consideration of the shape of the image that varies depending on the curvature of each area of the windshield glass and control the transmittance for the set transmittance control area.

Figures 3, 4:
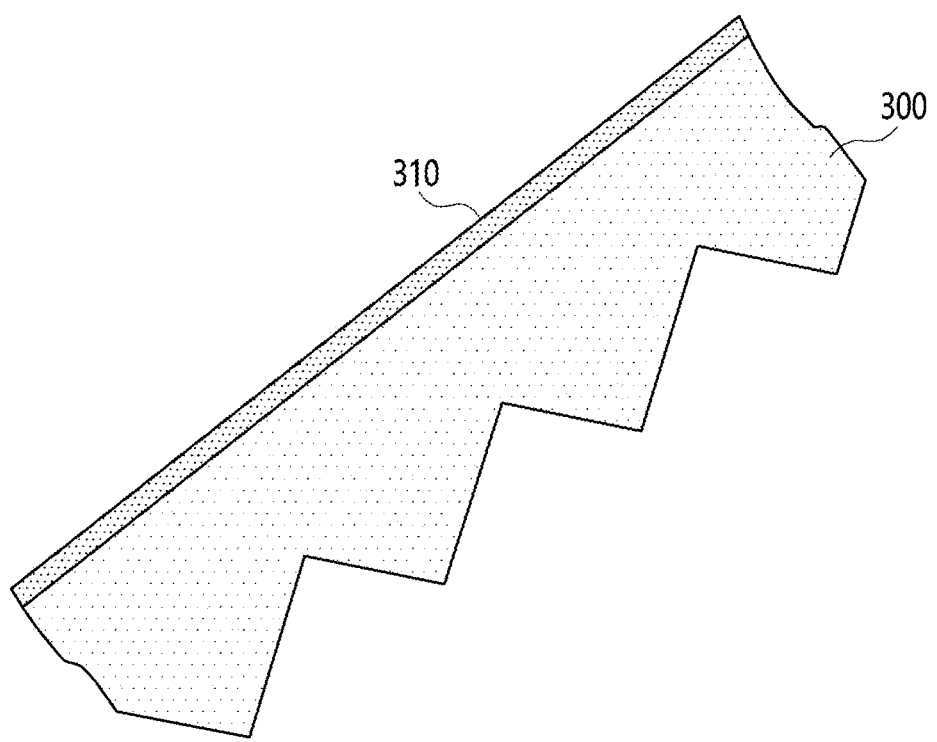
FIG. 3 is a view showing a portion of windshield glass according to the present disclosure.
FIG. 4 is a view showing one example of a transmittance control area and transmittance that are set for each area of windshield glass according to the present disclosure.

For example, FIG. 3 is a view showing a portion of the windshield glass according to the present disclosure, and the windshield glass according to the present disclosure may be formed in a form in which an optical path modification treatment surface 300 and a transmittance variable control surface 310 are fused. In this case, the transmittance controller may set the transmittance control area similar to the shape of the image of the transmittance variable control surface 310 and then lower the transmittance of the set transmittance control area to smaller than 10% so that the image projected by overlapping the transmittance control area can be clearly seen.

In this case, the windshield glass is curved, and the curvature may be different for each area in which the image may be projected. Therefore, the shape of the image projected onto the windshield glass may vary depending on the area in which the image is projected. FIG. 4 shows an example in which the shape of the image varies depending on the area in which the image is projected, and the transmittance controller may set the transmittance control area in consideration of the shape of the image in which a difference occurs, and the transmittance of the set transmittance control area may also be controlled together in consideration of the area in which the image is projected.

Then, the windshield glass may lower the transmittance of the transmittance control area set by the transmittance controller, and ultimately, since the transmittance control area is the area in which the image is projected, the transmittance of the area in which the image is projected may decrease.

Therefore, the image projected onto the windshield glass may be projected on a dark area such as the conventional ceramic area, making it clearer for the driver.

Figure 5:
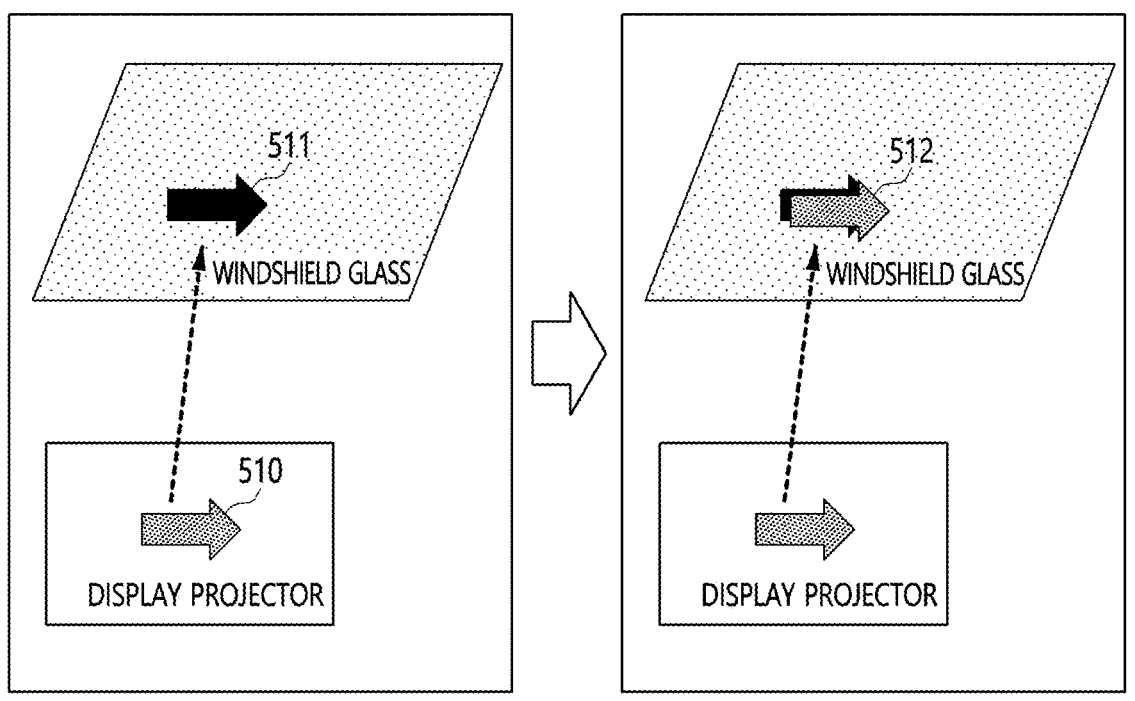
FIGS. 5 and 6 are views showing an example of an image being projected on the transmittance control area according to the present disclosure.

For example, referring to the left picture of FIG. 5, an image 510 output from the projector may be projected onto the windshield glass, and at the same time, a transmittance control area 511 may be set to match the area in which the image 510 is projected through the transmittance controller, and then the transmittance of the transmittance control area 511 may be controlled to be lowered. That is, rather than adjusting the entire transmittance of the windshield glass, the transmittance for only the area in which the image is projected may be controlled to be adjusted.

Ultimately, as shown in the right picture of FIG. 5, an image 512 projected onto the windshield glass may be projected onto a masking area or a black area with lowered transmittance, making it clearer for the driver.

In addition, referring to FIG. 2, the vehicle display device according to the present disclosure may check whether the area in which the image is projected matches the transmittance control area through the correction camera and provide error information to the control module to generate compensation information.

The compensation information generated in this way may be transmitted to the transmittance controller and used to correct the position and transmittance of the transmittance control area.

In addition, although not shown in FIG. 2, in the present disclosure, when the driver's gaze is changed, the projected image and position and transmittance control area may be changed according to the changed gaze.

Figure 6:
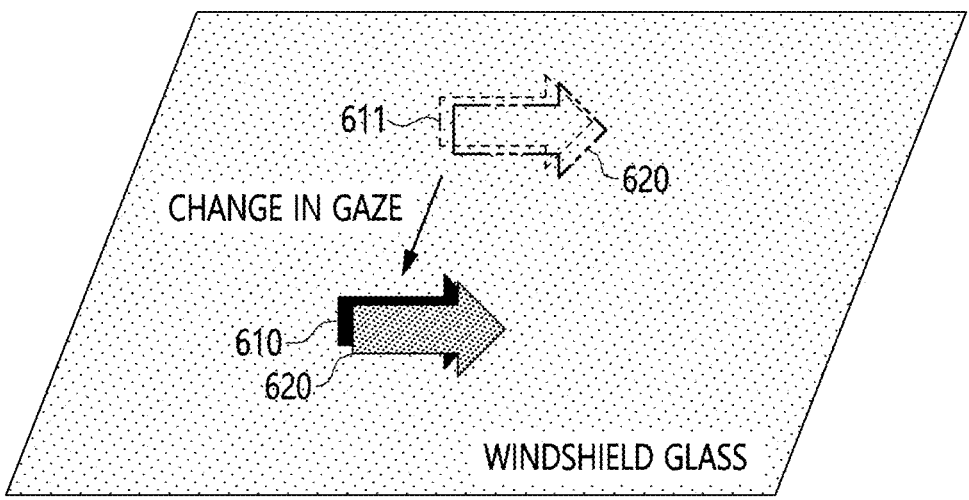

For example, referring to FIG. 6, when the driver's gaze is changed, the projector may reflect this in real time to correct a position of a projected image 610 before a change in gaze to a position of a projected image 620 after the change in gaze. At this time, the transmittance controller may also reflect the change in gaze in real time to correct a position of a transmittance control area 611 before the change in gaze to a position of a transmittance control area 621 after the change in gaze.

In addition, although not shown in FIG. 2, the projector according to the present disclosure may be installed at a position spaced apart from the cowl panel in the vehicle to prevent mutual interference. At this time, the windshield glass according to the present disclosure may refract the light output from the projector through the surface subjected to optical path modification processing to be transmitted to the driver's eyes.

Usually, the position of the projector is determined according to the position of the driver's eyes due to the characteristic that an incident angle and reflection angle of light are the same, and the above position may inevitably move to the front of the vehicle due to the inclination of the windshield glass of the vehicle. In this case, since interference occurs between a cowl panel positioned at the front of the vehicle and a projector 720 as in CASE 1 shown in FIG. 7, there is difficulty in arrangement.

Figure 7:
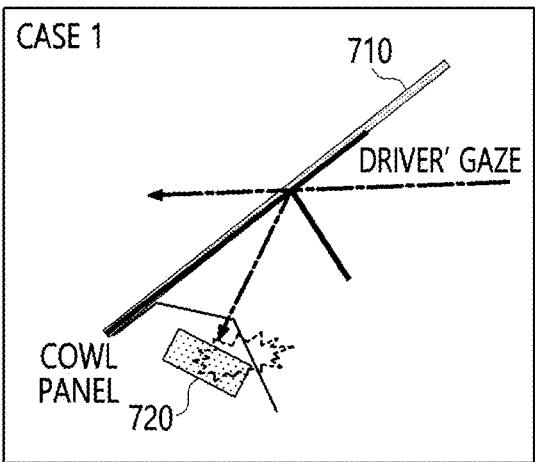
FIG. 7 is a view showing problems of the related art.
Figure 7:
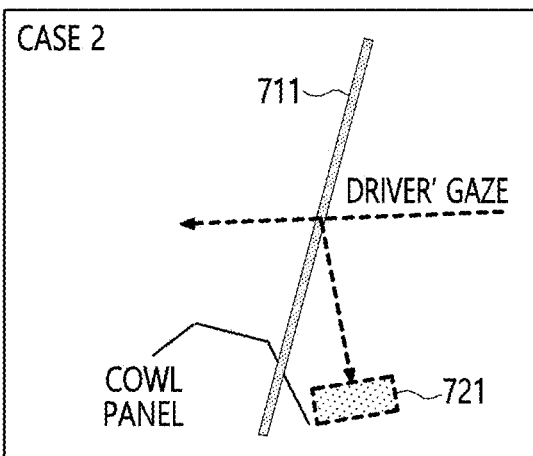

In this case, when an angle of a windshield glass 711 rotates counterclockwise as in CASE 2 shown in FIG. 7, a position of a projector 721 also rotates in the same direction as the position of the projector 721 to avoid the interference with the cowl panel, but since it may greatly affect the exterior design of the vehicle, it is difficult to adopt CASE 2 realistically.

Therefore, the present disclosure proposes a method of preventing the occurrence between the cowl panel and the projector at the same time without changing the exterior design of the vehicle by performing optical path modification processing on the surface of the windshield glass.

Figure 8:
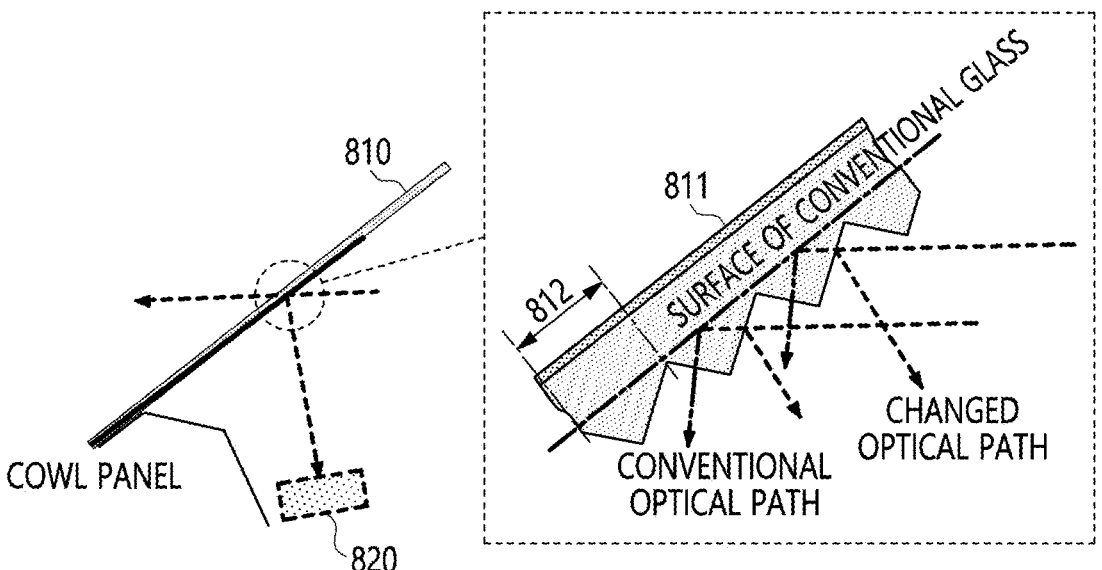
FIG. 8 is a specific view showing a position of a projector and the surface treatment of the windshield glass according to the present disclosure.

For example, referring to FIG. 8, the present disclosure may modify the surface of the windshield glass so that light from a projector 820 may be reflected to the driver's eyes without changing the angle of a windshield glass 810. That is, as shown in FIG. 8, a surface opposite to a transmittance variable control surface 811 of the windshield glass may be modified into a sawtooth shape to change a path through which light from the projector 820 is refracted. In this case, a surface processing unit 812 may be applied in a micrometer or less, thereby minimizing distortion of forward objects of the vehicle due to refractive reflection.

Figure 9:
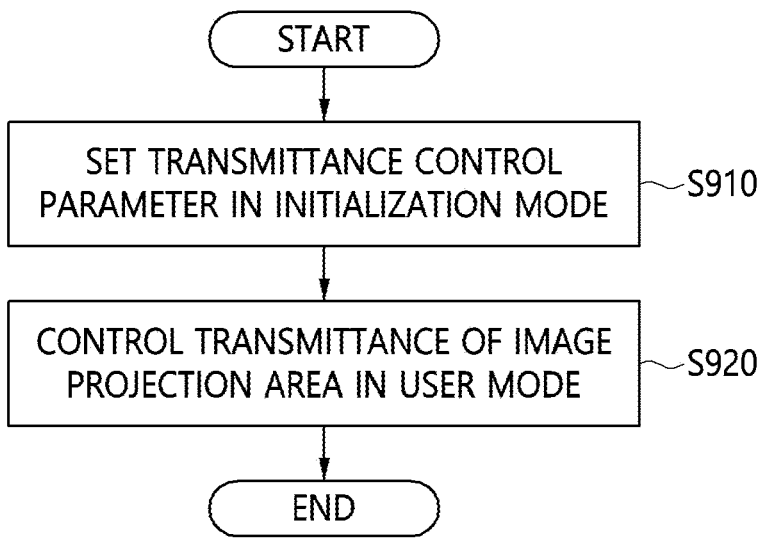
FIGS. 9, 10, and 11 are operational flowcharts showing a vehicle display method according to one embodiment of the present disclosure.
Figure 10:
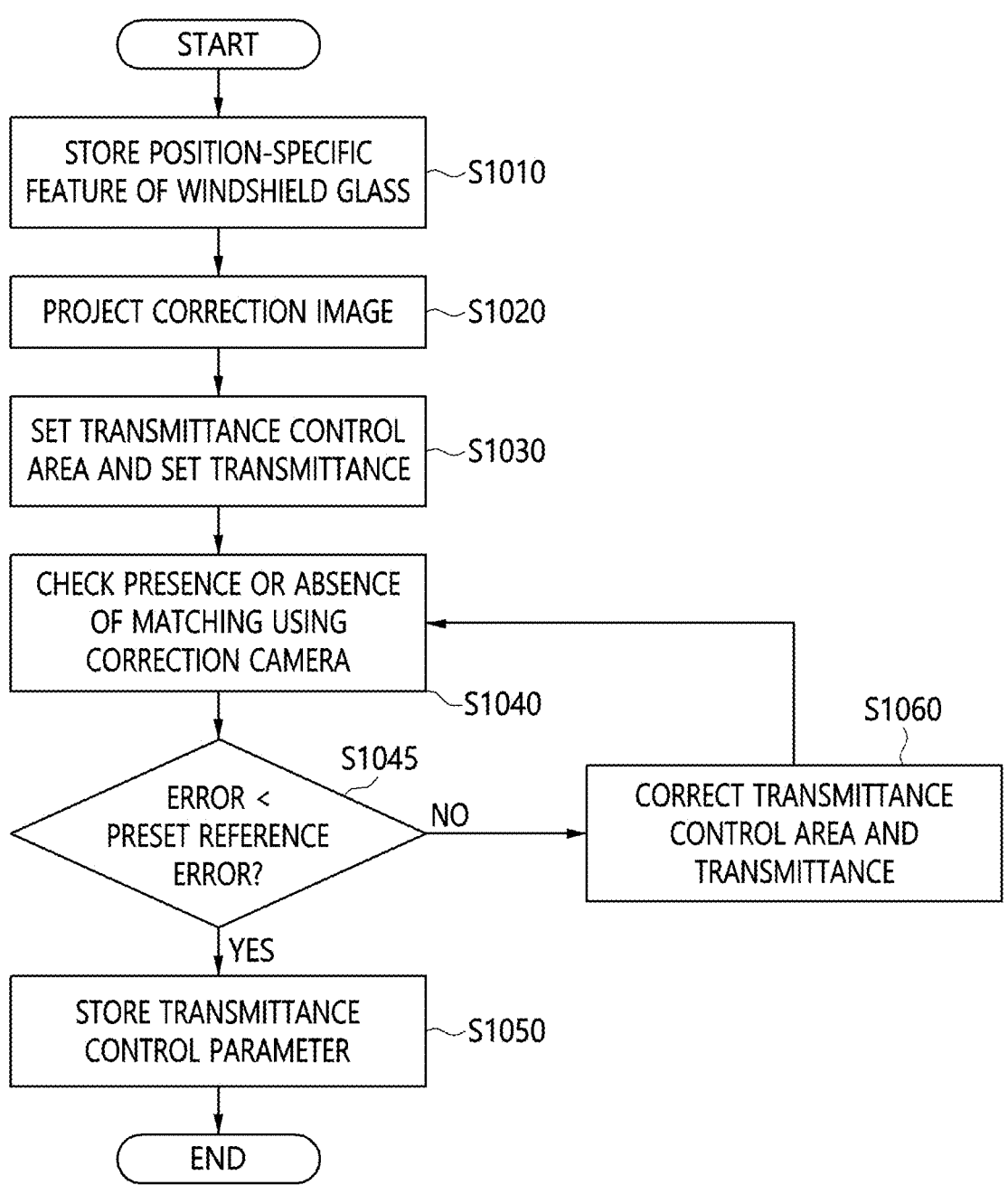
Figure 11:
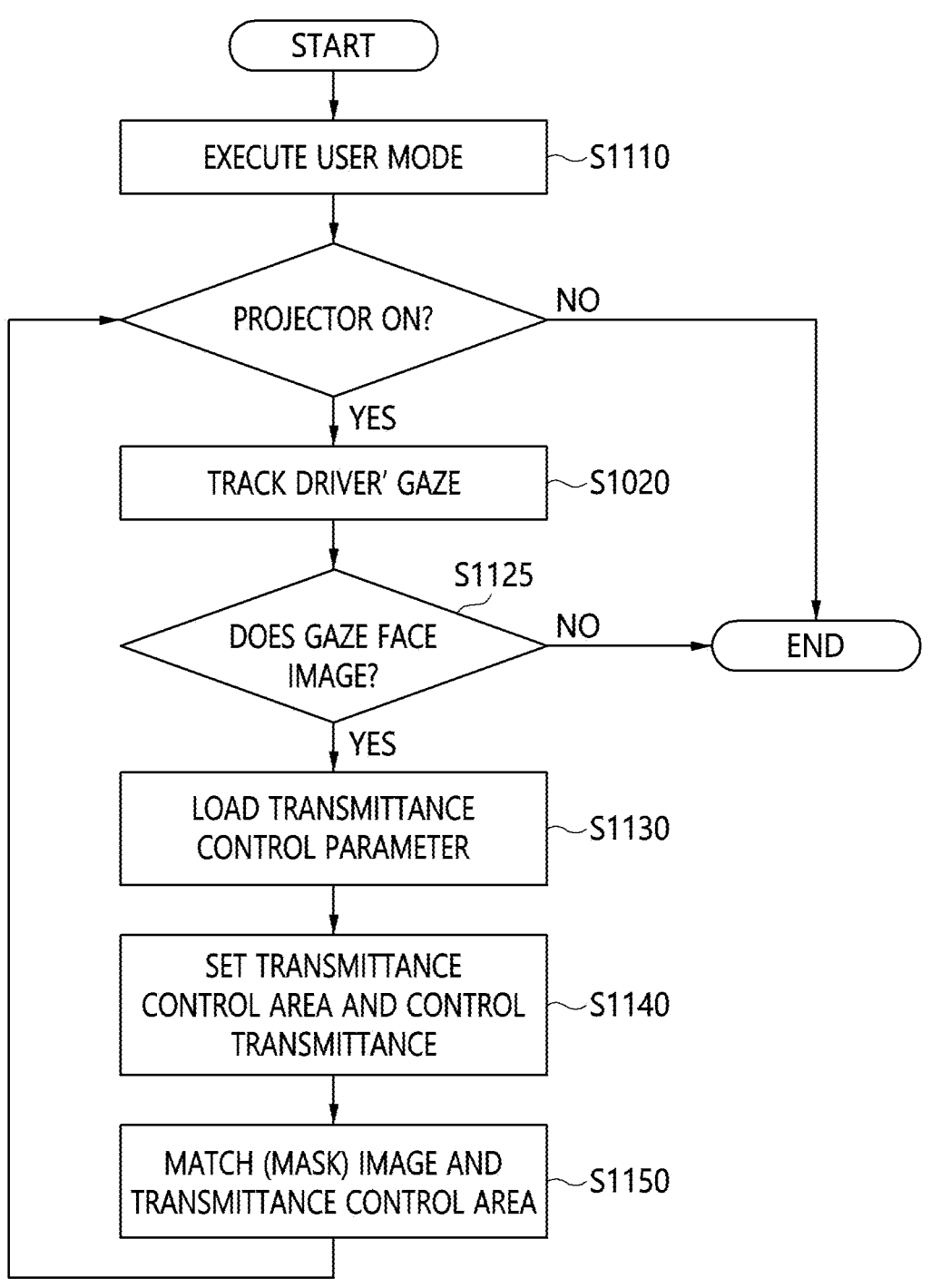

FIGS. 9 to 11 are operational flowcharts showing a vehicle display method according to one embodiment of the present disclosure.

First, referring to FIG. 9, a vehicle display method according to one embodiment of the present disclosure includes setting, by a vehicle display device, a transmittance control parameter of windshield glass to which a transmittance variable control technology is applied in an initialization mode (S910).

Hereinafter, an operation process of the initialization mode will be described in detail with reference to FIG. 10.

When the initialization mode of the vehicle display device is executed, an area-specific curvature of the windshield glass is stored (S1010).

For example, an area-specific curvature, bending angle, and the like of the windshield glass may be acquired through design data of the windshield glass and stored as a look-up table.

Then, after a correction image is generated from a control module, the correction image is projected onto the windshield glass through a projector (S1020).

Then, a transmittance control area is set in consideration of the shape of the correction image that changes according to the area-specific curvature of the windshield glass, and the transmittance for the set transmittance control area is controlled (S1030).

In this case, the transmittance of the transmittance control area may be lowered.

Then, whether an area in which the correction image is projected matches the transmittance control area may be checked through the correction camera (S1040).

Then, it is determined whether an error between the area in which the correction image is projected and the transmittance control area is smaller than a preset reference error (S1045), and when the error is smaller than the preset reference error, a parameter at the corresponding time point is stored as a transmittance control parameter (S1050).

In addition, at the result of determination in operation S1045, when the error is the preset reference error or more, the control module generates and provides compensation information to the transmittance controller to correct the transmittance control area and the transmittance (S1060).

In this case, the transmittance controller may perform correction in consideration of the area-specific curvature of the windshield glass.

Then, correction may be performed repeatedly from operation S1040 until the error is smaller than the preset reference error.

In addition, in the vehicle display method according to one embodiment of the present disclosure, the vehicle display device controls the transmittance of an area in which an image is projected on the windshield glass in a user mode according to a transmittance control parameter (S920).

Hereinafter, an operation process of the user mode will be described in detail with reference to FIG. 11.

When the user mode of the vehicle display device is executed (S1110), it may be determined whether a projector is in operation (S1115).

As the result of determination in operation S1115, when the projector is in operation, a driver's gaze is tracked (S1020).

Then, it is determined whether the driver's gaze faces the image projected on the windshield glass (S1125), and when the driver's gaze faces the image, the transmittance control parameter saved in the initialization mode is loaded (S1130).

Then, the transmittance control area is set according to the transmittance control parameter, and the transmittance for the set transmittance control area is controlled (S1140).

In this case, the transmittance of the transmittance control area may be lowered so that the image is clearly visible.

Then, the area in which the image is projected and the transmittance control area that has been masked due to a decrease in transmittance are matched (S1150).

Then, the method may return to operation S1115 to repeat the above operation in stages.

At this time, as the result of determination in operation S1115, when the projector is not executing, a function is ended.

In addition, as the result of determination in operation S1125, when the driver's gaze does not face the image projected by the projector, the function is ended.

In addition, the operations of the method or algorithm described in relation to the embodiments disclosed herein may be implemented in the form of program commands that may be executed through various computer devices such as a microprocessor, a processor, and a CPU and stored in a computer-readable medium. The computer-readable medium may include program (command) codes, data files, data structures, etc. alone or in combination.

The invention claimed is:

1. A vehicle display device comprising:
    a windshield glass to which a transmittance variable control technology is applied;
    a projector configured to project an image onto the windshield glass; and
    a transmittance controller configured to control a transmittance of an area in which the image is projected of the windshield glass;
    a control module configured to generate and provide the image to the projector; and
    a correction camera configured to check whether the area in which the image is projected matches the transmittance control area;
    wherein the transmittance controller is configured to set a transmittance control area corresponding to a deformed image shape, such that the image is deformed according to an area-specific curvature of the windshield glass; and
    wherein the transmittance controller is further configured to control a transmittance for the set transmittance control area such that an image portion overlapping the transmittance control area is displayed clearly; and
    wherein the control module is configured to generate compensation information based on an error between the area in which the image is projected and the transmittance control area, and to provide the compensation information to the transmittance controller.

2. The vehicle display device of claim 1, wherein the transmittance controller is configured to lower the transmittance of the transmittance control area so that the image is clearly visible.

3. The vehicle display device of claim 1, wherein the projector is provided at a position spaced from a cowl panel in a vehicle to prevent interference with the cowl panel, and wherein the windshield glass refracts light output from the projector to be transmitted to a driver's eyes through a surface subjected to optical path modification.

4. The vehicle display device of claim 1, further comprising:

a tracking camera configured to track a driver's gaze;

wherein the control module is configured to generate and provide the image to the projector together with gaze information; and wherein the image is projected onto a position corresponding to the driver's gaze on the windshield glass.

5. The vehicle display device of claim 4, wherein, when the driver's gaze is changed, the projector re-projects the image onto a position corresponding to the changed driver's gaze; and the transmittance controller re-sets the transmittance control area and the transmittance according to the area in which the image is re-projected.

6. The vehicle display device of claim 1, wherein the transmittance controller is configured to correct the transmittance control area and the transmittance according to the compensation information and an area-specific curvature of the windshield glass.

7. A vehicle display method comprising:

setting, by a vehicle display device, a transmittance control parameter of a windshield glass to which a transmittance variable control mode is applied in an initialization mode; and controlling a transmittance of an area in which an image is projected of the windshield according to the transmittance control parameter in a user mode;

wherein the setting of the transmittance control parameter comprises:

projecting a correction image onto the windshield glass;

setting a transmittance control area corresponding to a deformed shape of the correction image, such that the correction image is deformed according to an area-specific curvature of the windshield glass; and controlling a transmittance of the transmittance control area such that a portion of the correction image overlapping the transmittance control area is displayed clearly;

checking whether the area in which the image is projected matches the transmittance control area; and measuring an error between the area in which the correction image is projected and the transmittance control area, and generating compensation information based on the error.

8. The vehicle display method of claim 7, wherein the setting of the transmittance control parameter includes:

repeatedly correcting the transmittance control area and the transmittance according to the compensation information and the area-specific curvature of the windshield glass; and storing a parameter at a time when the error is smaller than a preset reference error through the correction as the transmittance control parameter.

9. The vehicle display method of claim 8, further comprising tracking a driver's gaze, wherein the image is projected onto a position corresponding to the driver's gaze on the windshield glass.

10. The vehicle display method of claim 9, further comprising:

when the driver's gaze is changed, re-projecting the image onto a position corresponding to the changed driver's gaze; and re-setting the transmittance control area and the transmittance according to the area in which the image is re-projected.

11. The vehicle display method of claim 7, wherein the controlling further includes setting the transmittance control area according to the transmittance control parameter, and controlling the transmittance for the set transmittance control area.

12. The vehicle display method of claim 11, wherein the controlling further includes lowering the transmittance of the transmittance control area so that the image is clearly visible.

* * * * *